United States Patent
Han et al.

(10) Patent No.: US 10,967,852 B2
(45) Date of Patent: Apr. 6, 2021

(54) VISUAL RANGE ADAPTER BY HEAD DETECTION FOR A-PILLAR

(71) Applicant: VIA Technologies, Inc., Taipei (TW)

(72) Inventors: Hsueh-hsin Han, Taipei (TW); Hsuan-chieh Huang, Taipei (TW)

(73) Assignee: VIA TECHNOLOGIES, INC., Taipei (TW)

( * ) Notice: Subject to any disclaimer, the term of this patent is extended or adjusted under 35 U.S.C. 154(b) by 0 days.

(21) Appl. No.: 16/833,787

(22) Filed: Mar. 30, 2020

(65) Prior Publication Data

US 2020/0384986 A1    Dec. 10, 2020

Related U.S. Application Data

(60) Provisional application No. 62/857,361, filed on Jun. 5, 2019.

(30) Foreign Application Priority Data

Jan. 10, 2020  (TW) .................................. 109100990

(51) Int. Cl.
| | | |
|---|---|---|
| *B60W 30/08* | (2012.01) | |
| *B60W 40/08* | (2012.01) | |
| *B60W 50/14* | (2020.01) | |

(52) U.S. Cl.
CPC ............ *B60W 30/08* (2013.01); *B60W 40/08* (2013.01); *B60W 50/14* (2013.01);
(Continued)

(58) Field of Classification Search
CPC .................................................... B60Q 9/008
See application file for complete search history.

(56) References Cited

U.S. PATENT DOCUMENTS

| | | | |
|---|---|---|---|
| 9,908,470 B1* | 3/2018 | Englander | ............... G01S 19/13 |
| 2008/0167757 A1* | 7/2008 | Kanevsky | .............. G07C 5/085 |
| | | | 701/1 |

(Continued)

FOREIGN PATENT DOCUMENTS

| | | |
|---|---|---|
| CN | 104249655 A | 12/2014 |
| TW | I333904 B | 12/2010 |

*Primary Examiner* — Nabil H Syed
*Assistant Examiner* — Cal J Eustaquio
(74) *Attorney, Agent, or Firm* — McClure, Qualey & Rodack, LLP

(57) ABSTRACT

A method, an apparatus and a system for displaying an image of a vehicle blind spot are provided. The apparatus is coupled to at least one external camera disposed outside the vehicle, at least one internal camera disposed inside the vehicle with a lens facing towards a driver, and at least one display disposed inside the vehicle. The method comprises capturing an image of the external environment of the vehicle by the external camera as an external image, capturing an image including the driver by the internal camera as an internal image, recognizing a face of the driver and a displacement of the face in the internal image, and adjusting a position of an ROI in the external image according to the recognized displacement, to display an image of the ROI on the display corresponding to the external camera. The displayed image of the external of the vehicle may be adjusted according to the posture or the angle of view of the driver, to have the image of the current blind spot by the driver shown correctly.

18 Claims, 7 Drawing Sheets

(52) U.S. Cl.
CPC ... *B60W 2050/146* (2013.01); *B60W 2420/42* (2013.01); *B60W 2540/225* (2020.02); *B60W 2554/4029* (2020.02)

(56) References Cited

U.S. PATENT DOCUMENTS

2010/0049405 A1    2/2010   Li
2019/0210617 A1*   7/2019   Langbein .......... B60W 60/0053

\* cited by examiner

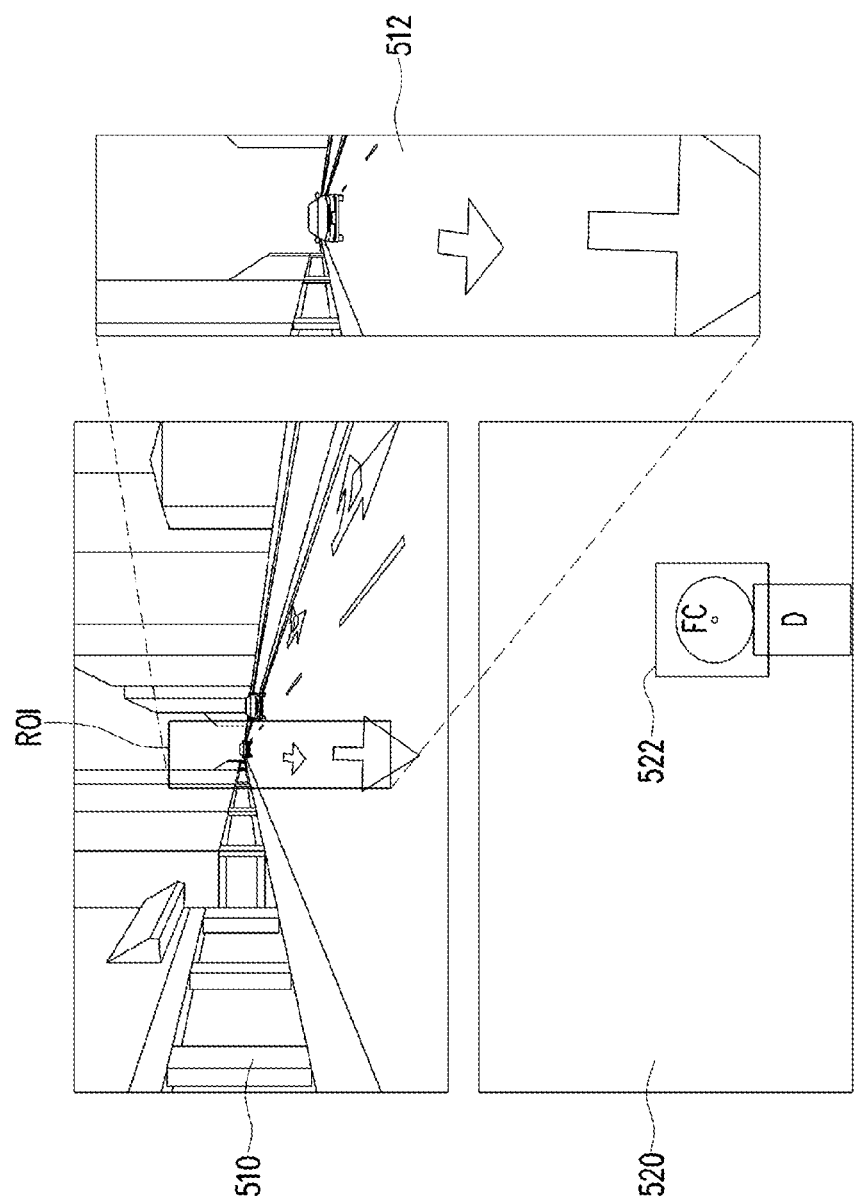

VISUAL RANGE ADAPTER BY HEAD DETECTION FOR A-PILLAR

CROSS-REFERENCE TO RELATED APPLICATIONS

This application claims the priority benefit of U.S. provisional application Ser. No. 62/857,361, filed on Jun. 5, 2019, and also the priority benefit of Taiwan application serial no. 109100990, filed on Jan. 10, 2020. The entirety of the above-mentioned patent applications is hereby incorporated by reference herein and made a part of this specification.

TECHNICAL FIELD

The present disclosure relates to a method and an apparatus for image processing, in particular to a method, an apparatus and a system for displaying an image of a vehicle blind spot.

BACKGROUND

A driver cannot have a full view of the external of the vehicle because of the blocking of his/her sight by the rearview mirrors and pillars of vehicle. The blocked field of view is referred as the blind spot or blind angle for the driver. In driving, accidents may happen because the driver cannot see people or vehicles at the blind spot or blind angle.

For example, from the left-forward view by a bus driver illustrated in FIG. 1A, part of the scene outside the vehicle is blocked by the left A-pillar 12 and the rearview mirror 14. And according to the blind spot region of a bus driver illustrated in FIG. 1B, the scene outside the bus 10 seen by the driver may be blocked by the left A-pillar 12 or the rearview mirror 14. As the blind spot region covers part of the crosswalk, accidents may happen due to the fact that the driver cannot see pedestrians in the blind spot region.

In order to solve the above problem with regard to the blind spot, vehicle manufacturers have proposed many solutions, such as providing a blind spot reminding device by means of a vehicle side sensing technology, capturing an image of an area beside the vehicle by a camera and projecting the image on a screen, modifying the design of pillars to project images of the external of the vehicle on the pillars by optical refraction, or even deploying openings on the pillars so that the external of the vehicle is visible to the driver.

However, modifying the design of pillars may weaken the robustness of the pillars, thereby having the safety compromised; while directly projections of the image of the area beside the vehicle may not show the image corresponding to the current blind angle in the view correctly and intuitively, due to the changes in the posture or the angle of view of the driver.

SUMMARY

In this regard, the present disclosure provides a method, an apparatus and a system for displaying an image of a vehicle blind spot, by which the displayed image of the external environment of the vehicle may be adjusted according to changes in the posture or the angle of view of the driver, to have the image of the current blind spot by the driver shown correctly.

According to an embodiment of the present disclosure, a method for displaying an image of a vehicle blind spot is adapted to an electronic device including a connection device and a processor, wherein the connection device is configured to couple to at least one external camera disposed outside a vehicle, at least one internal camera disposed inside the vehicle with a lens facing towards a driver, and at least one display disposed inside the vehicle. The method comprises capturing an image of the external environment of the vehicle by the external camera as an external image, capturing an image including the driver by the internal camera as an internal image, recognizing a face of the driver and a displacement of the face in the internal image, and adjusting a position of a region of interest (ROI) in the external image according to the recognized displacement, so as to display an image of the ROI on the display corresponding to the external camera.

According to an embodiment of the present disclosure, an apparatus for displaying an image of a vehicle blind spot comprises a connection device, a storage device and a processor, wherein the connection device is configured to be coupled to at least one external camera disposed outside a vehicle, at least one internal camera disposed inside the vehicle with a lens facing towards a driver, and at least one display disposed inside the vehicle. The storage device is configured to store a program. The processor is coupled to the connection device and the storage device and is configured to load and execute the program in the storage device, to use the external camera to capture an image of the external environment of the vehicle as an external image, use the internal camera to capture an image including the driver as an internal image, recognize a face of the driver and a displacement of the face in the internal image, and adjust a position of a region of interest (ROI) in the external image according to the recognized displacement, so as to display an image of the ROI on the display corresponding to the external camera.

According to an embodiment of the present disclosure, a system for displaying an image of a vehicle blind spot comprises at least one external camera, at least one internal camera, at least one display and an electronic device, wherein the external camera is disposed outside a vehicle, the internal camera is disposed inside the vehicle with a lens facing towards a driver, and the display is disposed inside the vehicle. The electronic device comprises a connection device and a processor, wherein the connection device is configured to couple to the external camera, the internal camera and the display. The processor is configured to use the external camera to capture an image of the external environment of the vehicle as an external image, use the internal camera to capture an image including the driver as an internal image, recognize a face of the driver and a displacement of the face in the internal image, and adjust a position of a region of interest (ROI) in the external image according to the recognized displacement, so as to display an image of the ROI on the display corresponding to the external camera.

To make the above features and advantages of the present disclosure apparent and easy to understand, embodiments are described below in details with reference to the drawings.

BRIEF DESCRIPTION OF THE DRAWINGS

FIGS. 5A and 5B show examples of the method for displaying an image of a vehicle blind spot according to an embodiment of the present disclosure.

The numerical references are given briefly as below.

10: bus; 12, P1, P2: A-pillar; 14: rearview mirror; 100: apparatus for displaying an image of a vehicle blind spot; 110: connection device; 120: storage device; 130: processor; 300: system for displaying an image of a vehicle blind spot; 510, 510': external images; 520, 520': internal images; 512, 512': images of ROI; 522, 522': rectangles; C1, C2: external cameras; C3: internal camera; D: driver; FC, FC': center reference points; M1, M2: displays; ROI, ROI': regions of interest; S402~S406: steps.

DETAILED DESCRIPTION

In addition to a camera provided outside the vehicle (e.g., on the outer side of the pillar) for capturing an image of the external of the vehicle as an external image, the present disclosure further provides a camera inside the vehicle to capture an image of the driver, recognizes a face of the driver and a displacement of the face by deep learning algorithms and feeds them back to the display of the external image. Hence an image of a blocked region in the view of the driver may be displayed properly, to help the driver determine the outside conditions, so as to reduce the rate of accidents.

Figure 1A:
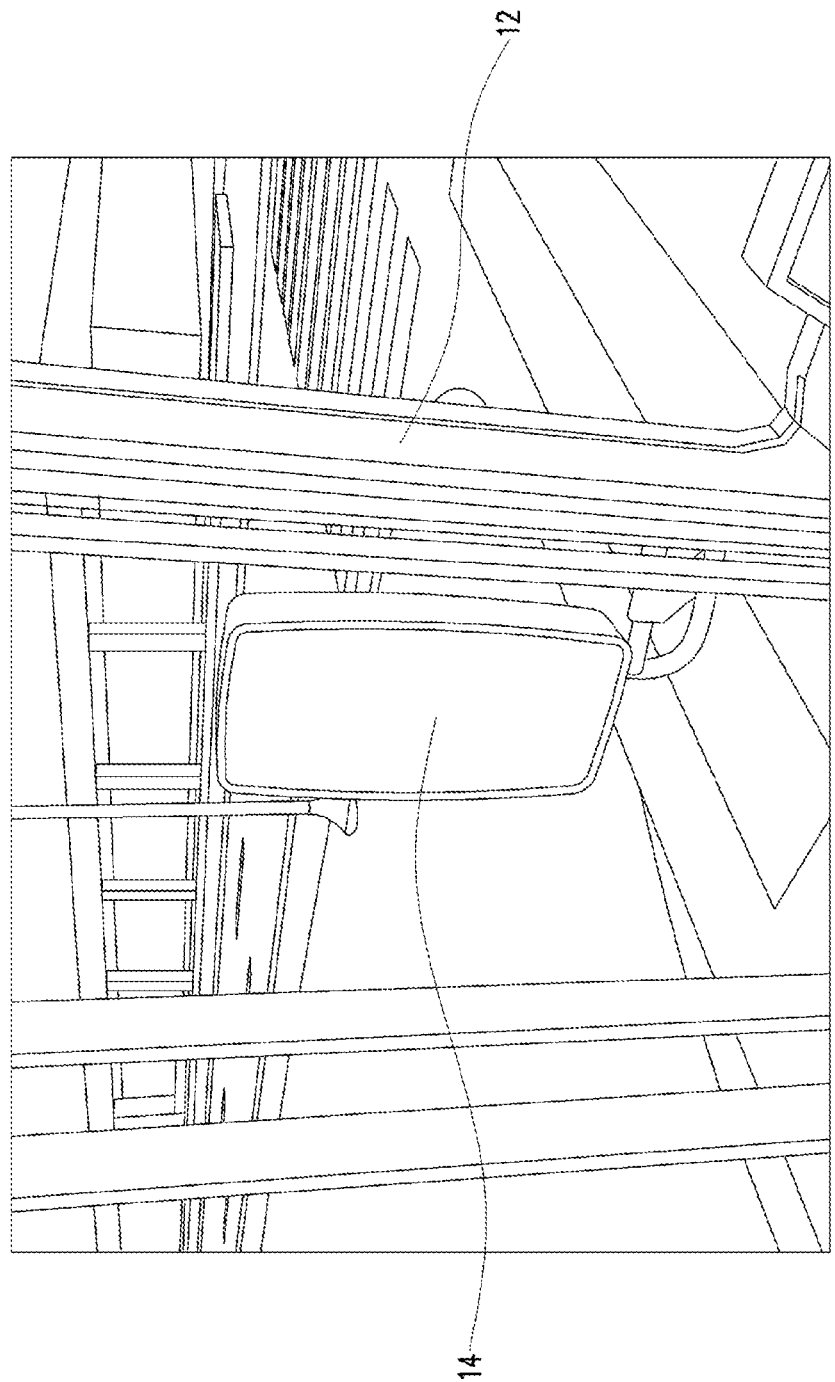
FIG. 1A shows a left-forward view by a bus driver.
Figure 1B:
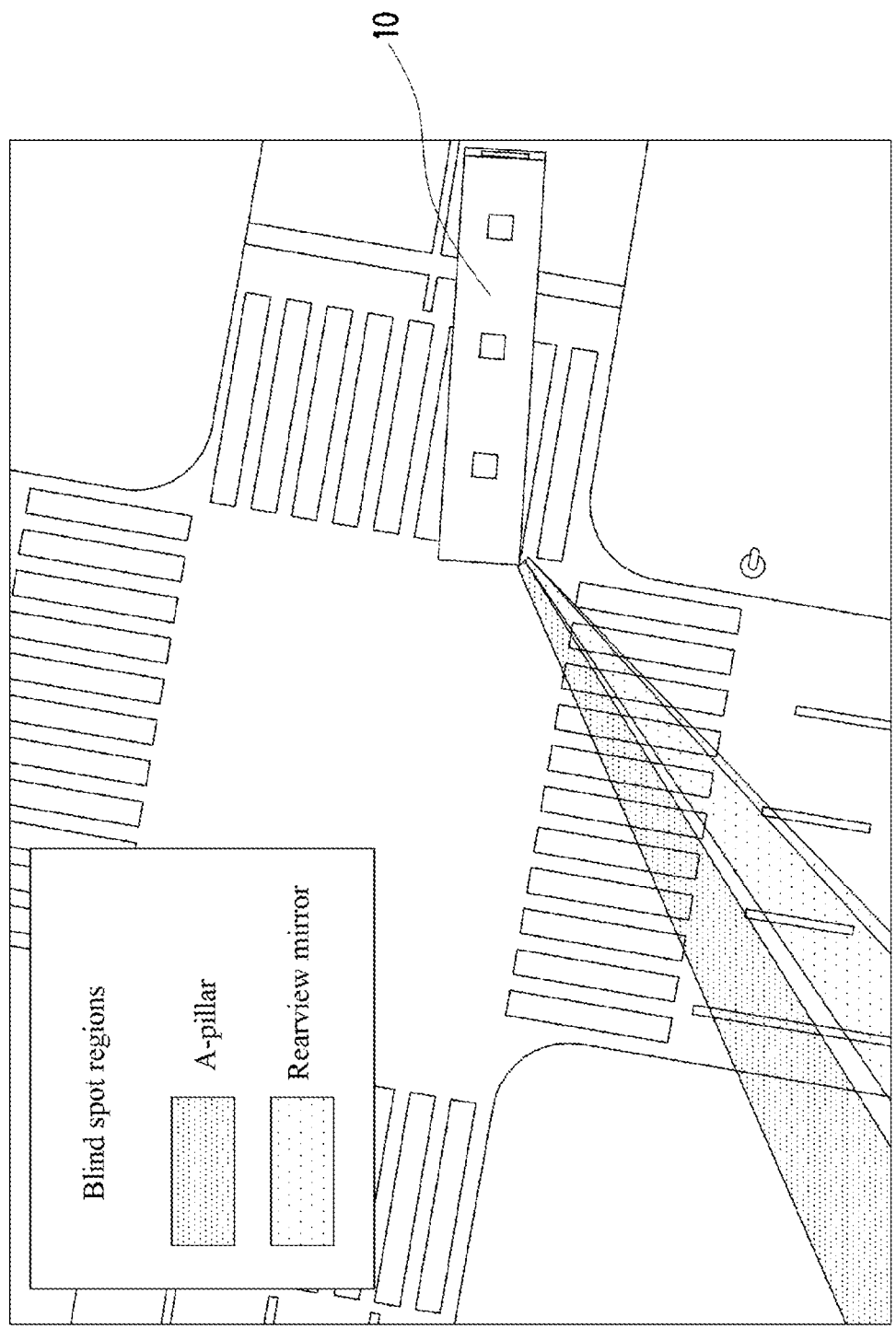
FIG. 1B shows blind spot regions of a bus driver.
Figure 2:
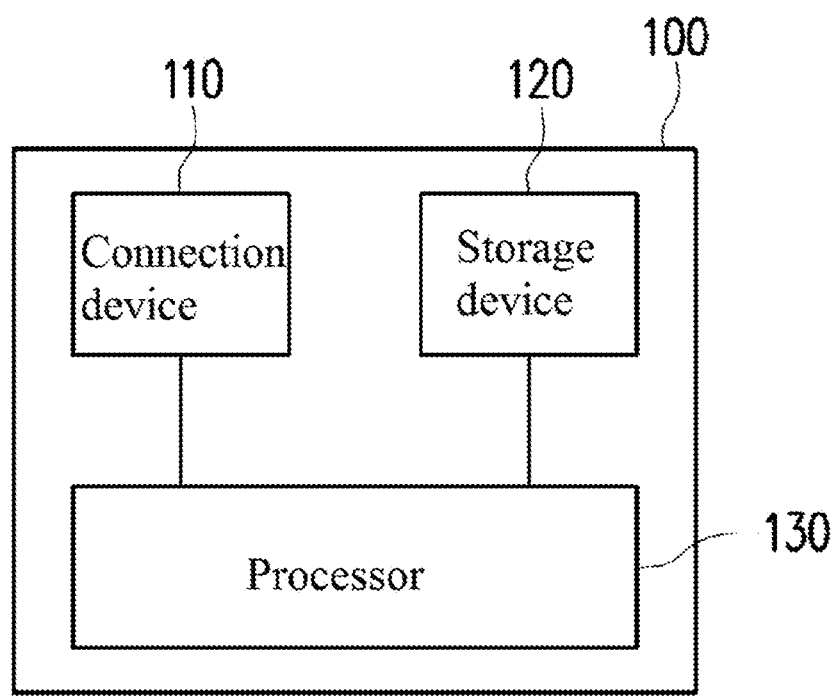
FIG. 2 shows a block diagram of the apparatus for displaying an image of a vehicle blind spot according to an embodiment of the present disclosure.

FIG. 2 shows a block diagram of the apparatus for displaying an image of a vehicle blind spot according to an embodiment of the present disclosure. The apparatus 100 for displaying an image of a vehicle blind spot includes at least a connection device 110, a storage device 120 and a processor 130. The apparatus 100 for displaying an image of a vehicle blind spot is, for example, an electronic device having a computing function, such as a personal computer, a server, a tablet, a navigation device, a Cambox, and a vehicle PC, which is not limited herein.

The connection device 110 is configured to couple to at least one external camera disposed on outer side of at least one pillar (e.g., the left A-pillar and the right A-pillar) of the vehicle, at least one internal camera disposed inside the vehicle and having a lens facing towards the diver, and at least one display disposed on inner side of the pillar, so as to receive an image from the external camera and that from the internal camera and to output a processed external image to the display. Specifically, the connection device 110 may be connected with the external camera and the internal camera in any wired or wireless manner and receive an image captured by the external camera and that from the internal camera. It may be of a transmission interface such as Universal Serial Bus (USB), RS232, Bluetooth (BT), or Wireless fidelity (Wi-Fi), which is not limited herein. On the other hand, the connection device 110 may also be of an image output interface for outputting the processed external image to the display, such as Video Graphics Array (VGA), High Definition Multimedia Interface (HDMI), or Thunderbolt, which is not limited herein.

Figure 3:
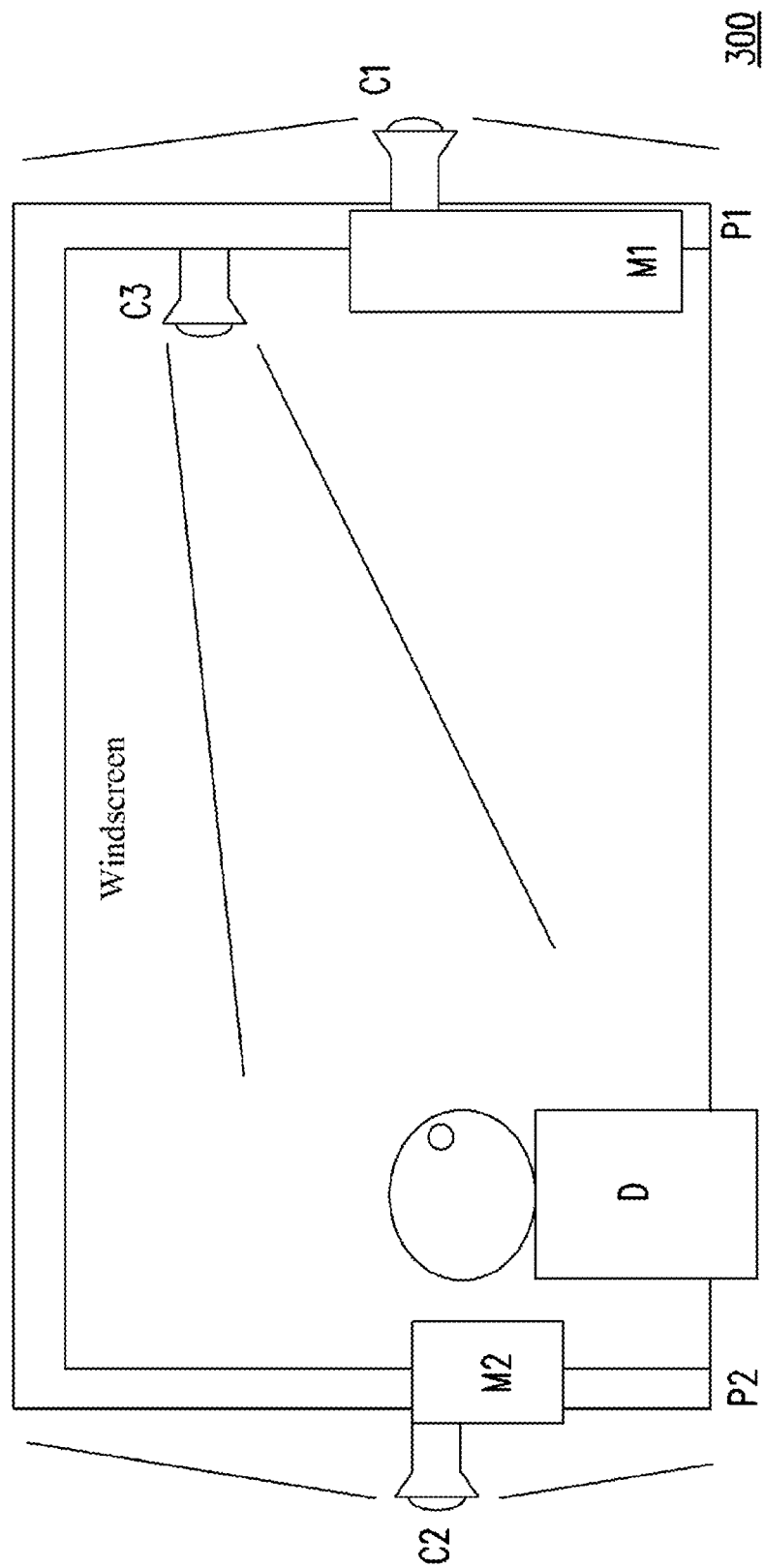
FIG. 3 shows a schematic diagram of the system for displaying an image of a vehicle blind spot according to an embodiment of the present disclosure.

For example, FIG. 3 shows a schematic diagram of a system for displaying an image of a vehicle blind spot according to an embodiment of the present disclosure (the apparatus 100 for displaying an image of a vehicle blind spot is not shown). In FIG. 3, the system 300 according to the present embodiment shows the arrangement of the camera and the display connected to the apparatus 100 for displaying an image of a vehicle blind spot in FIG. 2. In the system 300 according to the present embodiment, cameras C1 and C2 are respectively disposed on the outer sides of the right A-pillar P1 and the left A-pillar P2 of the vehicle, so as to capture external images of the right side and the left side of the vehicles respectively. The cameras C1 and C2 may be, for example, a wide field camera with a relatively wide field of view (FOV) (e.g., 120 to 150 degrees), a fisheye camera (e.g., 190 degrees), or a pinhole camera, which is not limited herein. In an embodiment, the cameras C1 and C2 are disposed on the A-pillars P1, P2 of the vehicle at a height of, for example, 120 to 150 cm (in particular, 140 cm) above the ground, so as to avoid collisions with people or external objects. In further embodiments, the height may be adjustable according to factors including the type of the vehicle, the figure of the driver, the external environment, etc., which is not limited herein. In some other embodiments, the cameras C1 and C2 may also be disposed at other positions outside the vehicle.

In addition, the system 300 according to the present embodiment provides displays M1 and M2 respectively on the inner sides of the right A-pillar P1 and the left A-pillar P2 of the vehicle, to display the external images of the right side and the left side captured by the cameras C1 and C2, respectively. In an embodiment, the displays M1 and M2 are planar displays or flexible displays such as a Liquid Crystal Display (LCD) display, a Light-Emitting Diode (LED) display, or other types of display, which is not limited herein. In an embodiment, the displays M1 and M2 are, for example, projection screens of a projector, capable of displaying the images projected by the projector. In some other embodiments, the cameras C1 and C2 may also be provided at other positions inside the vehicle. In some other embodiments, there may be only one display provided on either one of the right A-pillar P1 and the left A-pillar P2, or there may be two or more displays.

It should be noted that the electronic device 100 of the present embodiment uses a camera C3 disposed on the inner side of the right A-pillar P1 of the vehicle to capture an image including the driver D as an internal image and detects the face of the driver D and the displacement of the face by deep learning algorithms, so as to adjust the external images displayed by the displays M1 and M2 accordingly. In an embodiment, the camera C3 may be disposed at other positions inside the vehicle with an appropriate distance (e.g., 1 to 2 m) from the driver D. In an embodiment, the camera C3 may be for example a camera with a relatively narrow field of view (e.g., 30 to 60 degrees), which is not limited herein.

The storage device 120 may be, for example, any type of fixed or movable Random Access Memory (RAM), read-only memory (ROM), flash memory, hard disk, or similar components or a combination thereof, so as to store a program executable by the processor 130.

The processor 130 is coupled to the connection device 110 and the storage device 120 and thus is capable of loading and executing the program stored in the storage device 120. In different embodiments, the processor 130 may be, for example, a Central Processing Unit (CPU), a Graphics Processing Unit (GPU), other general or dedicated programmable microprocessors, a Digital Signal Processor (DSP), a programmable controller, Application Specific Integrated Circuits (ASIC), a Programmable Logic Device (PLD), or other similar devices or a combination thereof, which is not limited herein.

Figure 4:
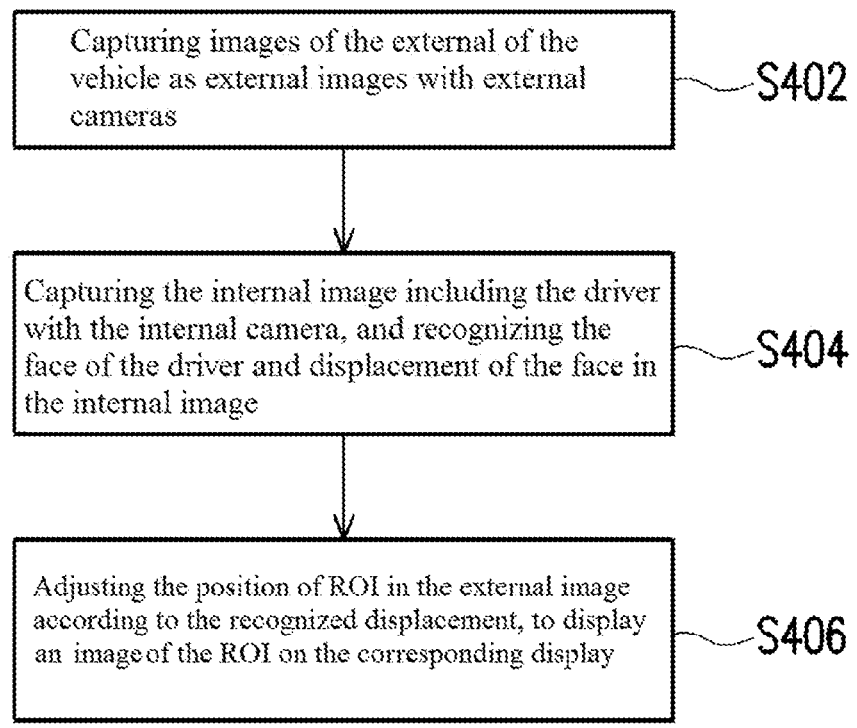
FIG. 4 shows a flow chart of the method for displaying an image of a vehicle blind spot according to an embodiment of the present disclosure.

FIG. 4 shows a flow chart of the method for displaying an image of a vehicle blind spot according to an embodiment of the present disclosure. With reference to FIGS. 2 and 4, the method of the present embodiment is applicable to the apparatus 100 for displaying an image of a vehicle blind spot. Detailed steps of the method for displaying an image of a vehicle blind spot of the present embodiment is described as below with respect to the components of the apparatus 100 for displaying an image of a vehicle blind spot.

In step S402, the processor 130 uses the external cameras (e.g., C1 and C2) to capture images of the external environment of respective vehicle pillars as external images, wherein the external camera is for example a wide-field camera with a relatively wide field of view (FOV) or a fisheye camera, so as to capture external images covering all the possible blind spots of a driver in the driving seat.

In step S404, the processor 130 uses the internal camera (e.g., C3) to capture the internal image including the driver and recognizes the face of the driver and displacement of the face in the internal image. In an embodiment, when the apparatus 100 for displaying an image of a vehicle blind spot is used for the first time (e.g., when the driver first acquires the vehicle) or started to be used (e.g., when the driver starts the vehicle), initial setup may be performed, where for example the processor 130 uses the internal camera to capture in advance an initial image of the driver sitting in the driving seat, detects facial features of the driver in the initial image by deep learning algorithms and records a face location. Multiple existing deep learning algorithms for face recognition are accessible for those skilled in the art, which will not be further described herein. In the initial setup, for each region of interest (ROI) displayed on a corresponding display from an external image captured by a respective external camera, the driver may manually adjust (for example, but not limited to, by operating a user interface or a remote control of the apparatus 100 for displaying an image of a vehicle blind spot) an angle of view or a scale factor of the ROI to meet the driver's requirements. Meanwhile, the apparatus 100 for displaying an image of a vehicle blind spot may record the initial setup for each ROI corresponding to the face location. In subsequent actual driving, the processor 130 may continuously recognize the face in multiple frames of the internal images by deep learning algorithms.

In some embodiments, for example in a bus, an internal image may include multiple faces at the same time (e.g., a driver and passengers), and the processor 130 may recognize the multiple faces in the internal image. In such cases, the processor 130 may determine that a face in the internal image which is closest to the face of the driver recognized in a previous frame is the face of the driver in the current frame. Hence, even if the internal image includes multiple faces at the same time (e.g., the passengers), the processor 130 is still capable of accurately recognizing the driver, so as to correctly implement the method for displaying an image of a vehicle blind spot according to the embodiment of the present disclosure.

It should be noted that, in order to solve the problem of deficient image quality and recognition caused by deficient light when driving at night, in an embodiment, the internal camera may be a camera with an active light source (e.g., IR illuminator) to improve the imaging quality at night. In other embodiments, the processor 130 may not be able to recognize a face in every frame of the internal image by deep learning algorithms (e.g., when the light is insufficient). In such cases, the processor 130 of the apparatus 100 may continuously recognize faces in the internal frames with deep learning algorithms in combination with feature points in a face area. As long as a face is recognized in several frames, the processor 130 may focus on, according to the face location in the several frames, an area around the face location in the image of a subsequent frame and continue to recognize an object area in the subsequent frame with identical feature points with the area of the recognized face, as the face in the subsequent frame. Through the combination of the aforementioned face recognition and motion estimation technology, it is possible to continuously track the face under a condition of low light source.

In step S406, the processor 130 adjusts the position of a region of interest (ROI) in the external image according to the recognized displacement, so as to display an image of the ROI on the corresponding display. In the embodiment of the present disclosure, for example, a blocked region in the current view of the driver may be defined in the external image captured by the external camera as the ROI; an amount of movement of the ROI is calculated, when the face of the driver has moved, according to a conversion relationship between an amount of movement of the head of the driver and the amount of movement of the ROI, so that the eventual obtained image of the ROI match or cover the blind spot of the current view of the driver. In some embodiments, during driving, the procedure of FIG. 4 may be repeated every other one or more frames, so as to display an image of the ROI on the display in real-time.

Specifically, the processor 130 for example uses the recognized displacement to calculate an amount of movement of the face (e.g., in units of pixels of the internal image), so as to calculate an amount of movement of the ROI (e.g., in units of pixels of the external image) corresponding to the amount of movement of the face, according to a conversion relationship between the amount of movement of the face and the amount of movement of the ROI; and then the ROI is moved by the calculated amount of movement in a direction opposite to the displacement of the face to decide a final position of the ROI.

For example, in the initial setup, coordinates (e.g., in units of pixels of the internal image) of a rectangle enclosing a face profile may be obtained by recognizing the face with deep learning algorithms, including coordinates of an upper left vertex and coordinates of a lower right vertex of the rectangle. With these coordinates, coordinates of a center of the rectangle may be calculated, which function as the coordinates ($FC_x$, $FC_y$) of a face center reference point FC. In driving, by continuing the recognition of faces in frames using deep learning algorithms, coordinates ($FC_x'$, $FC_y'$) of a displaced face center reference point FC' may be obtained. In other embodiments, the recognized rectangle enclosing the face profile may be of other shapes; and the coordinates of the face center reference point may be determined by other methods (e.g., as the centroid of the shape).

In an embodiment, as a change in the blocked region of the view in driving mainly depends on an amount of movement in the horizontal direction (i.e., x direction) of the head/face, only an amount of head/face movement in the horizontal direction ($FC_x'-FC_x$) is used for each frame to calculate the amount of movement of the region of interest (ROI) for said frame with respect to the ROI in the initial setup, including an amount of movement $S_R$ of a right ROI displayed on a right A-pillar display and an amount of movement $S_L$ of a left ROI displayed on a left A-pillar display. The calculation formulas are:

$$S_L=|(FC_x'-FC_x)|\times n\times a$$

$$S_R=|(FC_x'-FC_x)|\times n\times b$$

wherein n is a scale coefficient, a is an ROI displacement coefficient for the left A-pillar, and b is an ROI displacement coefficient for the right A-pillar. In an embodiment, n is 0.0005, a is 1.5, and b is 1. The value of the above coefficients may be adjusted according to different conditions, and are not limited herein. In an embodiment, when the display on the A-pillar is closer to the driver, the corresponding ROI displacement coefficient is greater (e.g., the ROI displacement coefficient for the left A-pillar which is closer to the driver is greater than the ROI displacement coefficient for the right A-pillar which is farther to the driver), i.e., the amount of movement of the ROI corresponding to the displacement of the head/face of the driver is greater. Although the amount of movement of the ROI during driving is calculated above based on the displacement of the face center reference point in each frame with respect to the face center reference point in the initial setup, nonetheless, in another embodiment, an amount of movement of the ROI for each frame with respect to the ROI for the previous frame may be calculated from an displacement of the face center reference point for the respective frame with respect to the face center reference point for the previous frame. In yet another embodiment, the scale coefficient n, the ROI displacement coefficient a for the left A-pillar, and the ROI displacement coefficient b for the right A-pillar may be proportional to a scale factor for on each display in the initial setup. In another embodiment, a face displacement threshold may be defined, so that the position of the ROI in the external image is adjusted accordingly only when $|(FC_x'-FC_x)|$ is greater than the face displacement threshold; otherwise, the position of the ROI is not adjusted to save computing resources.

It should be noted that, the above embodiments do not take vertical displacements into consideration in the calculation of the amount of movement of the ROI, because a driver seldom moves the head/face vertically when driving. However, in other embodiments, the amount of movement of the head/face in the vertical direction may also be used to calculate the amount of movement of the ROI to adjust a vertical position of the ROI, which is not limited herein.

Figure 5B:
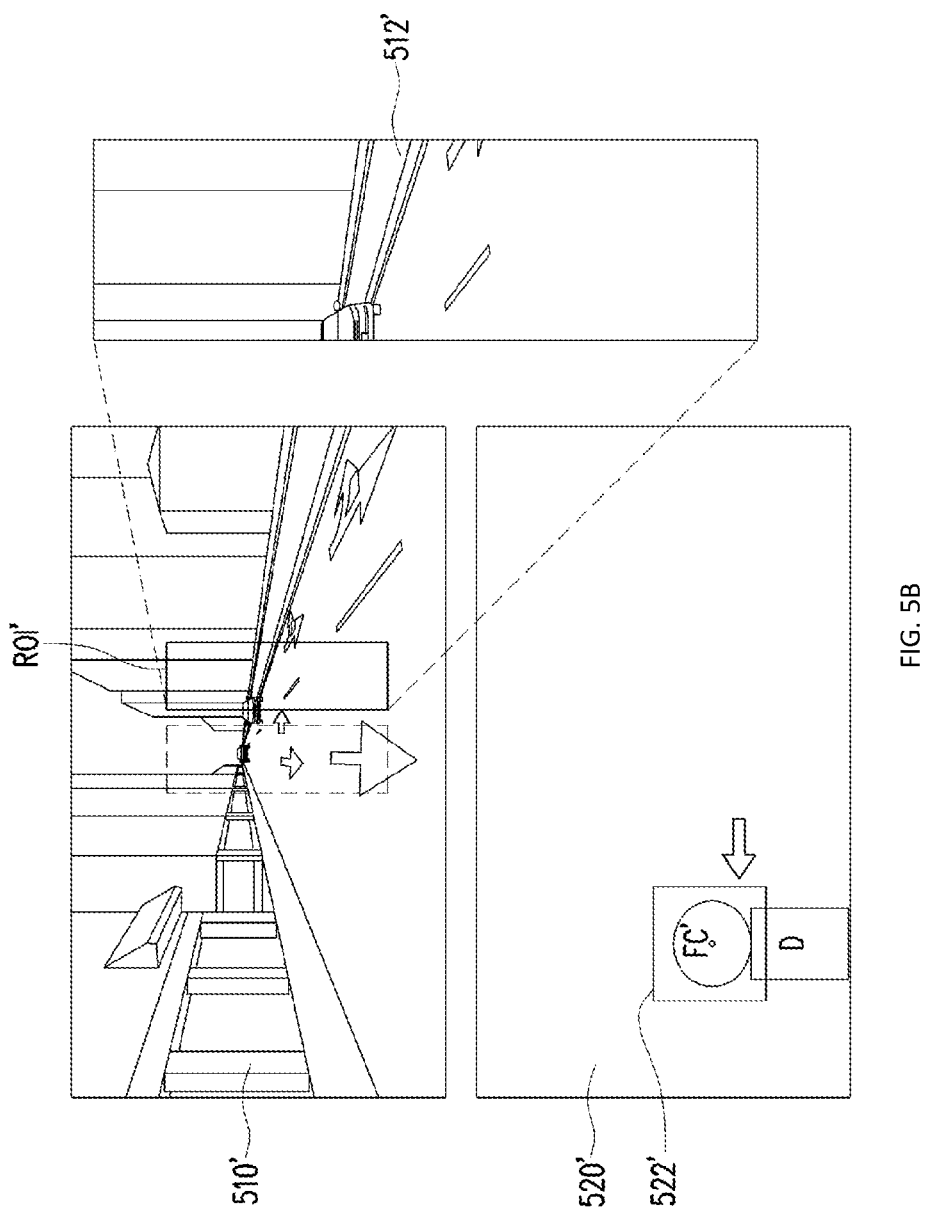

FIGS. 5A and 5B show examples of the method for displaying an image of a vehicle blind spot according to an embodiment of the present disclosure. By taking reference to FIG. 5A together with FIG. 3, FIG. 5A shows an external image 510 captured by the external camera C2 and an internal image 520 captured by the internal camera C3 at time t. The face of the driver D in the internal image 520 may be detected by deep learning algorithms, as well as that coordinates of the center reference point FC of the rectangle 522 may be obtained. Based on the coordinates of the center reference point FC, the position of the ROI in the external image 510 (i.e., the blind spot region in the view of the driver D) may be calculated according to a predetermined conversion relationship. Image 512 of the ROI may be captured accordingly to be displayed on the display M2 disposed on the pillar P2. Those skilled in the art may understand that, if a resolution of the ROI is different from the resolution of the display for displaying the image, the apparatus 100 for displaying an image of a vehicle blind spot or the display may adjust the resolution accordingly.

Next, by taking reference to FIG. 5B together with FIG. 3, FIG. 5B shows an external image 510' captured by the external camera C2 and an internal image 520' captured by the internal camera C3 at time t+Δt. The face of the driver D in the internal image 520' may be detected by deep learning algorithms, and the coordinates of the center reference point FC' of the rectangle 522' may be obtained. Based on the coordinates of the center reference point FC' and those of the center reference point FC obtained previously at the time t, the amount of movement of the driver D's head during the period Δt may be calculated. According to the conversion relationship between the amount of movement of the face and the amount of movement of the ROI, the amount of movement of the ROI may be calculated, to move the ROI by the calculated amount of movement in a direction opposite to the displacement of the face, so as to obtain a position of a new region of interest ROI'. Image 512' of the ROI' is captured accordingly to be displayed on the display M2 disposed on the pillar P2. The external image 510' and the internal image 520' captured at the time t+Δt, for example, are images captured respectively by the external camera C2 and the internal camera C3 which immediately follow the external image 510 and the internal image 520, or which follow after a fixed interval time which can be set by the user and is not limited herein.

In an embodiment, the apparatus 100 for displaying an image of a vehicle blind spot may further perform face recognition on the external image captured by the external camera, based on its face recognition function, so as to recognize a pedestrian appearing in the external image. When a pedestrian is detected, the apparatus 100 for displaying an image of a vehicle blind spot may issue a warning message by means of an in-vehicle audio or display to remind the driver about the pedestrian, thereby reducing the accidents. In an embodiment, the warning message may be issued when the apparatus 100 for displaying an image of a vehicle blind spot determines that a distance between the pedestrian in the external image and the vehicle is less than a predetermined value (e.g., 2.5 m), wherein the distance between the pedestrian and the vehicle may be estimated from, for example, the amount of pixels occupied by the pedestrian in the external image or the position of the feet of the pedestrian in the external image. In other embodiments, the apparatus 100 for displaying an image of a vehicle blind spot may also detect a pedestrian in the external image by other pedestrian detection algorithms, which is not limited herein. In some embodiments, the pedestrian detection and/or the adjustment of the position of the ROI may not be performed when the vehicle is resting.

In summary, in the method, apparatus and system for displaying an image of a vehicle blind spot according to the present disclosure, the position of the ROI in the external image is adjusted according to the amount and the direction of the movement of the head of the driver, so as to correctly show an image of the current blind spot in the view of the driver depending on a change in the posture or the angle of view of the driver, thereby helping the driver determine the condition outside the vehicle for a reduced accident rate. In addition, the method, apparatus and system for displaying an image of a vehicle blind spot according to the present disclosure may be implemented as long as the vehicle is provided with cameras and displays, which is convenient for use on a conventional model of vehicle without affecting the robustness of the body structure of the vehicle. Although the embodiments of the present disclosure are mainly described with respect to a bus or a truck, the present disclosure is also applicable to other types of vehicles such as sedans and SUVs.

Although preferred embodiments of the present disclosure have been described above, it will be appreciated that the present disclosure is not limited thereto. A number of variations and modifications may occur to those skilled in the art without departing from the scopes and spirits of the present disclosure. Therefore, it is intended that the scope of protection of the present disclosure is defined by the appended claims.

The invention claimed is:

1. A method for displaying an image of a vehicle blind spot, adapted to an electronic device including a connection device and a processor, the connection device coupling to at least one external camera disposed outside a vehicle, at least one internal camera disposed inside the vehicle with a lens facing towards a driver, and at least one display disposed inside the vehicle, the method comprising:
    capturing an image of the external environment of the vehicle by the external camera as an external image;
    an image including the driver by the internal camera as an internal image, and recognizing a face of the driver and a displacement of the face in the internal image; and adjusting a position of a region of interest (ROI) in the external image according to the recognized displacement, to display an image of the ROI on the display corresponding to the external camera,
    wherein adjusting a position of an ROI in the external image according to the recognized displacement comprises calculating an amount of movement of the ROI corresponding to a displacement of the face according to a conversion relationship between the displacement of the face and the amount of movement of the ROI; and
    moving the ROI by the calculated amount of movement in a direction opposite to the displacement of the face.

2. The method according to claim 1, wherein, before recognizing a face of the driver and a displacement of the face in the internal image, the method further comprises:
    capturing in advance an initial image of the driver sitting in a driving seat by the internal camera, and
    detecting the face of the driver in the initial image, and recording a location of the face and an initial setup for the ROI corresponding to the location of the face.

3. The method according to claim 1, wherein recognizing a face of the driver and a displacement of the face in the internal image comprises:
    when multiple faces are recognized in the internal image, determining, in a current frame of the internal image, a face closest to the face of the driver recognized in a previous frame as the face of the driver in the current frame, so as to calculate the displacement of the face.

4. The method according to claim 1, wherein recognizing a face of the driver and a displacement of the face in the internal image comprises:
    detecting the face of the driver in the internal image; and according to a location of the face recognized in a frame, recognizing from a subsequent frame an object area located around said location and having identical feature points with an area of the recognized face, as the face in the subsequent frame, so as to calculate the displacement of the face.

5. The method according to claim 1, wherein, the ROI is moved by the calculated amount of movement in a direction opposite to the displacement of the face only if the displacement of the face is greater than a face displacement threshold; otherwise, the ROI is not moved.

6. The method according to claim 1, further comprising:
    recognizing a pedestrian present in the external image captured by the external camera; and
    issuing a warning message when the pedestrian is detected.

7. An apparatus for displaying an image of a vehicle blind spot, comprising:
    a connection device coupling to at least one external camera disposed outside a vehicle, at least one internal camera disposed inside the vehicle with a lens facing towards a driver, and at least one display disposed inside the vehicle;
    a storage device to store a program; and
    a processor coupled to the connection device and the storage device, wherein the processor is configured to load and execute the program stored in the storage device to:
    use the external camera to capture an image of the external environment of the vehicle as an external image;
    use the internal camera to capture an image including the driver as an internal image, and recognize a face of the driver and a displacement of the face in the internal image; and
    adjust a position of a region of interest (ROI) in the external image according to the recognized displacement, and display an image of the ROI on the display corresponding to the external camera,
    wherein the processor is configured to calculate an amount of movement of the ROI corresponding to a displacement of the face according to a conversion relationship between the displacement of the face and the amount of movement of the ROI; and,
    wherein the processor is configured to calculate an amount of movement of the ROI corresponding to a displacement of the face according to a conversion relationship between the displacement of the face and the amount of movement of the ROI.

8. The apparatus according to claim 7, wherein the processor is configured to
    use the internal camera to capture in advance an initial image of the driver sitting in a driving seat,
    detect the face of the driver in the initial image, and record a location of the face and an initial setup for the ROI corresponding to the location of the face.

9. The apparatus according to claim 7, wherein, when multiple faces are recognized in the internal image, the processor is configured to determine, in a current frame of the internal image, a face which is closest to the face of the driver recognized in a previous frame as the face of the driver in the current frame, so as to calculate the displacement of the face.

10. The apparatus according to claim 7, wherein the processor is configured to
    detect the face of the driver in the internal image, and according to a location of the face recognized in a frame, recognize from a subsequent frame an object area located around said location and having identical feature points with an area of the recognized face, as the face in the subsequent frame, so as to calculate the displacement of the face.

11. The apparatus according to claim 7, wherein the processor is configured to move the ROI by the calculated amount of movement in a direction opposite to the displacement of the face only if the displacement of the face is greater than a face displacement threshold; otherwise, the ROI is not moved.

12. The apparatus according to claim 7, wherein the processor is further configured to recognize a pedestrian present in the external image captured by the external camera, and issue a warning message when the pedestrian is detected.

13. A system for displaying an image of a vehicle blind spot, comprising:
  at least one external camera disposed outside a vehicle;
  at least one internal camera disposed inside the vehicle with a lens facing towards a driver; at least one display disposed inside the vehicle; and
  an electronic device comprising a connection device and a processor, wherein the connection device couples to the external camera, the internal camera and the display, wherein the processor is configured to:
  use the external camera to capture an image of the external environment of the vehicle as an external image;
  use the internal camera to capture an image including the driver as an internal image, and recognize a face of the driver and a displacement of the face in the internal image; and
  adjust a position of a region of interest (ROI) in the external image according to the recognized displacement, to display an image of the ROI on the display corresponding to the external camera,
  wherein the processor is configured to calculate an amount of movement of the ROI corresponding to a displacement of the face according to a conversion relationship between the displacement of the face and the amount of movement of the ROI; and,
  move the ROI by the calculated amount of movement in a direction opposite to the displacement of the face.

14. The system according to claim 13, wherein the processor is configured to
  use the internal camera to capture in advance an initial image of the driver sitting in a driving seat,
  detect the face of the driver in the initial image, and
  record a location of the face and an initial setup for the ROI corresponding to the location of the face.

15. The system according to claim 13, wherein, when multiple faces are recognized in the internal image, the processor is configured to determine, in a current frame of the internal image, a face closest to the face of the driver recognized in a previous frame as the face of the driver in the current frame, so as to calculate the displacement of the face.

16. The system according to claim 13, wherein the processor is configured to
  detect the face of the driver in the internal image, and
  according to a location of the face recognized in a frame, recognize from a subsequent frame an object area located around said location and having identical feature points with an area of the recognized face, as the face in the subsequent frame, so as to calculate the displacement of the face.

17. The apparatus according to claim 13, wherein the processor is configured to move the ROI by the calculated amount of movement in a direction opposite to the displacement of the face only if the displacement of the face is greater than a face displacement threshold; otherwise, the ROI is not moved.

18. The system according to claim 13, wherein the processor is further configured to recognize a pedestrian present in the external image captured by the external camera, and issue a warning message when the pedestrian is detected.

* * * * *